US010142255B1

(12) United States Patent
Pachon et al.

(10) Patent No.: US 10,142,255 B1
(45) Date of Patent: Nov. 27, 2018

(54) ALLOCATING DYNAMIC RESOURCES TO SERVICE CLUSTERS

(71) Applicant: Amazon Technologies, Inc., Seattle, WA (US)

(72) Inventors: Julian Pachon, Austin, TX (US); Marc Joseph Anderson, Austin, TX (US); Laura Lynn Housley, Seattle, WA (US); Amandeep Singh, Issaquah, WA (US); Beryl Tomay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 268 days.

(21) Appl. No.: 15/259,912

(22) Filed: Sep. 8, 2016

(51) Int. Cl.
*H04L 12/911* (2013.01)
*G06F 17/30* (2006.01)
*H04L 29/08* (2006.01)

(52) U.S. Cl.
CPC ........ *H04L 47/70* (2013.01); *G06F 17/30377* (2013.01); *H04L 67/16* (2013.01)

(58) Field of Classification Search
CPC .... H04L 47/70; H04L 67/16; G06F 17/30377
See application file for complete search history.

(56) References Cited

U.S. PATENT DOCUMENTS

| | | | | |
|---|---|---|---|---|
| 7,665,090 B1 * | 2/2010 | Tormasov | ............. | G06F 9/4881 718/104 |
| 9,507,612 B1 * | 11/2016 | Henry | ...................... | G06F 9/452 |
| 9,612,878 B2 * | 4/2017 | Di Balsamo | .......... | G06F 9/5083 |
| 2010/0293549 A1 * | 11/2010 | Brelsford | .............. | G06F 9/5066 718/104 |
| 2011/0112938 A1 * | 5/2011 | Inoue | ................... | G06Q 10/087 705/28 |
| 2012/0096165 A1 * | 4/2012 | Madduri | ............... | G06F 9/5011 709/226 |
| 2013/0204659 A1 * | 8/2013 | Grichnik | ................ | G06Q 10/04 705/7.31 |
| 2016/0292608 A1 * | 10/2016 | Yin | ................... | G06Q 10/06315 |
| 2016/0359761 A1 * | 12/2016 | Sussman | ............ | G06Q 30/0283 |
| 2018/0032543 A1 * | 2/2018 | Fecioru | ............. | G06F 17/30516 |

OTHER PUBLICATIONS

U.S. Appl. No. 15/242,274, filed Aug. 19, 2016, Title: Allocating Resource Blocks to Dynamic Resources.

* cited by examiner

*Primary Examiner* — Michael A Keller
(74) *Attorney, Agent, or Firm* — Kilpatrick Townsend & Stockton LLP

(57) ABSTRACT

Techniques for efficiently managing resources are described. In an example, a computer system may access a forecast for demand associated with utilizing a service during a time period, where the service is available from service sources grouped in clusters. The computer system may identify resources scheduled to facilitate the service. Based on a scheduled start time for utilizing a resource, the forecast, and an allocation of remaining resources to the clusters, the computer system may allocate the resource to a first cluster and may provide a notification about the allocation to an associated client device. At a subsequent time during the time period, the computer system may re-allocate the resource to a second cluster based on a current utilization of the resource, an update to the forecast, and the allocation of the remaining resources. A respective notification may be provided to the client device.

20 Claims, 8 Drawing Sheets

ALLOCATING DYNAMIC RESOURCES TO SERVICE CLUSTERS

BACKGROUND

Various systems exist for providing services to users. Many of such systems deploy resources to facilitate the services. The resources may be dynamic in the sense that the availability, number, and deployment timeframes of the resources may change over time and/or in service areas.

Generally, a system may consider the demand for a particular service in a service area. The service area may be divided into multiple clusters. The system attempts to allocate the resources to the clusters by balancing the availability, number, and deployment timeframes of the resources against the demand. However, many technical challenges exist and can result in sub-optimal utilization of the resource or, in certain situations, a failure to meet the demand.

Some of the technical challenges relate to searching for the optimal balance. For example, if the resources are allocated favorably to a particular set of clusters, the demand in the remaining clusters may be underserved. Conversely, if the resources are uniformly distributed across the clusters, a high-demand cluster may be underserved, while a low-demand cluster may be overserved and allocated resources may sit idle. Hence, one existing approach to deal with an uneven demand distribution may allocate the resources based on specific distribution in each cluster.

However, even with this approach, many technical challenges remain when the demand is also dynamic. More particularly, the demand for the service in each cluster may be random and, thus, may change over time. Unless the allocation of the dynamic resources is updated over time to re-balance against the dynamic demand for a holistic redistribution across the clusters, the demand may not be properly met and the resources may be inefficiently utilized. On the other hand, if some sort of redistribution is performed, the redistribution results in additional technical challenges. One additional technical challenge relates to the number of times a resource is re-allocated. Specifically, any time the resource is redistributed from one cluster to another cluster, a down time arises during which the resource may not be usable to facilitate the service. Thus, a high frequency of re-allocation may translate into a long down time and, thus, inefficient utilization of the resource. Another additional technical challenge relates to providing information about the redistribution. Specifically, the system should transmit notifications to client devices about the redistributions. If too many notifications are transmitted, network bandwidth and computing resource usage may be wasted. Conversely, if too little notifications are transmitted, certain responses from the client devices may not be timely and, accordingly, the service may not be timely facilitated to certain users. In both examples, the notification scheme may impact how well the demand is met.

BRIEF DESCRIPTION OF THE DRAWINGS

Various embodiments in accordance with the present disclosure will be described with reference to the drawings, in which.

DETAILED DESCRIPTION

Figure 1:
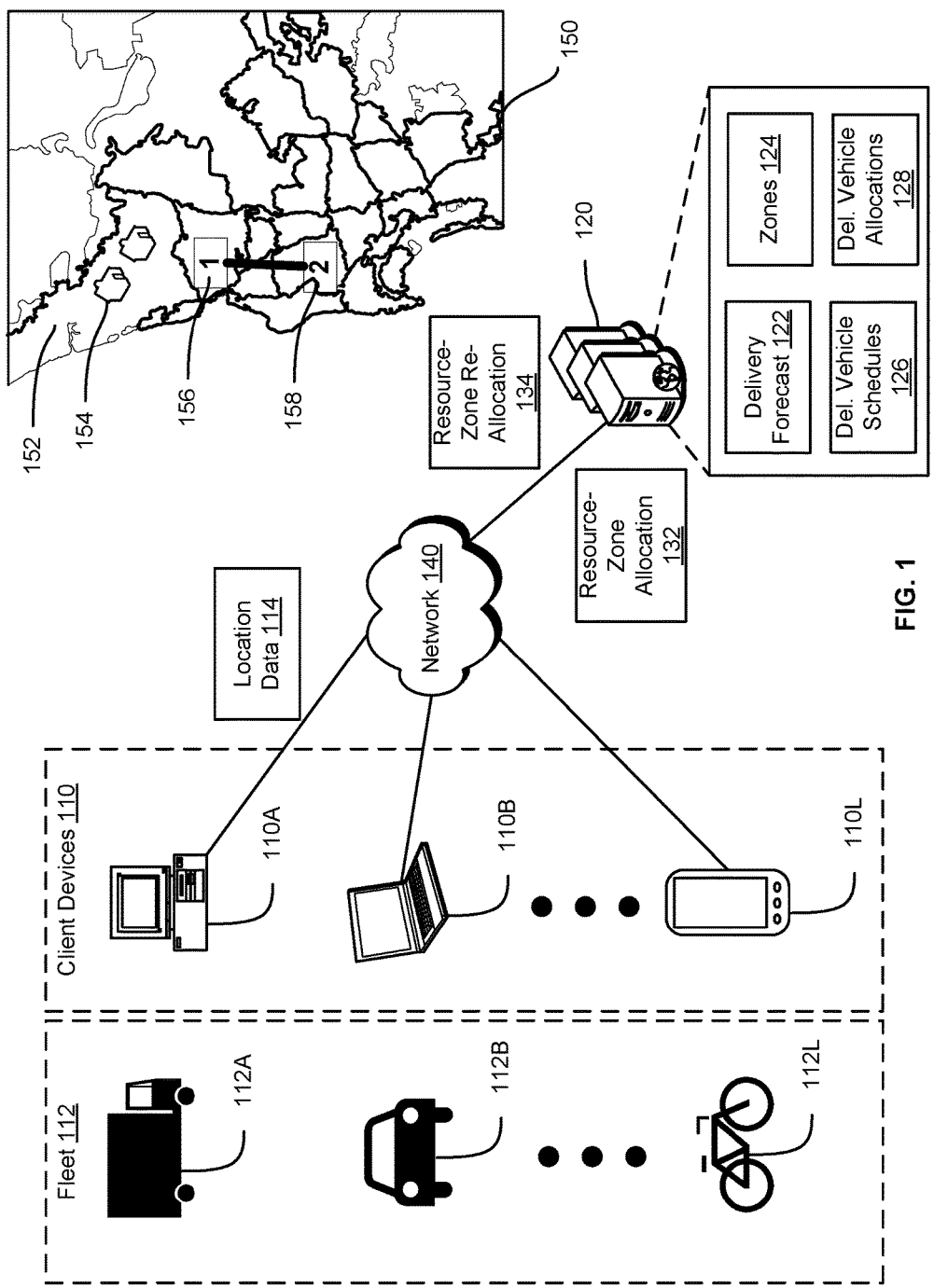
FIG. 1 illustrates an example environment for managing the distribution of dynamic resources based on a dynamic demand for a service, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order to not obscure the embodiment being described.

Embodiments of the present disclosure are directed to, among other things, optimally distribute resources across clusters to facilitate services to users. Generally, a management system may be configured to perform the distribution. While the resources may be dynamic, the demand for a service may also be dynamic. Accordingly, the management system may holistically distribute the resources to the clusters based on the dynamicity of both the resources and the demand. Specifically, the distribution may include an initial allocation of a resource to a cluster and, over time, a re-allocation of the resource to another cluster and/or of another resource to the cluster. For the initial allocation, the system may consider the forecast for the demand across the clusters for a period of time, the availability of the resource and other resources for that period of time, properties of the clusters, and any current allocations of the other resources to the clusters. The system may balance these parameters against a set of objectives and constraints to determine an optimal distribution of the resources to the clusters. The set of objectives may, for example, minimize any shortage stemming from the demand exceeding the capacity provided by an allocation of the resources. The set of constraints may favor shortages occurring later during the time period by imposing higher penalties on earlier shortages. Over time, a more refined forecast for the demand may become available. Further, the resource availabilities may change and actual utilizations of the resources may be available. Accordingly, the system may consider an update to the forecast for the remainder of the time period, the remaining resource availabilities, the current utilizations, and the current allocations. The system may re-balance these parameters against the same or a different set of objectives and constraints to determine an optimal redistribution. For instance, while minimizing shortages and favoring later ones, the system may minimize the number of re-allocations. The system may transmit targeted information to client devices about the allocations and the re-allocations only when such events may have occurred.

To illustrate, consider an example of a delivery management system implemented to manage item deliveries based on crowd-sourcing. This system may generally manage how the items may be moved between source and destination locations within a geographic area given a dynamic fleet of delivery vehicles. To do so, the delivery management system may consider a delivery vehicle as a resource and a demand for items as a demand for a delivery service. Each delivery vehicle may be scheduled for a block of time and may be associated with a client device for transmitting location information and receiving deployment instructions. Further, the geographic area may be divided into zones. Each zone may correspond to a cluster of sources from which the items may be available (e.g., a cluster of source locations).

To efficiently manage the item deliveries and delivery vehicles, the delivery management system may dynamically pre-deploy the fleet of delivery vehicles to the different zones during a period of time (e.g., a day). Once an actual order for an item is received during the time period, the delivery management system may instruct, via a client device, a particular delivery vehicle to deliver the item from the respective source location.

The pre-deployment may be managed in a staged approach across the different delivery vehicles and zones. In a first stage, a delivery vehicle may be scheduled for a time block of the time duration (e.g., for four hours of the day). Given the schedule of the delivery vehicle, a forecast for the demand, properties of the zones (e.g., number of zones, needed delivery capacity per zone, etc.), and the allocations of other delivery vehicles to the zones, the delivery management system may allocate the delivery vehicle to a particular zone. The delivery management system may send a notification to the client device. The notification may identify the zone and instruct an operator of the delivery vehicle to move to the zone for the length of the scheduled time block. In a second stage, given the remaining schedule of the delivery vehicle, a current route or location of the delivery vehicle within the allocated zone, an update to the forecast, the zone properties, the allocations and utilizations (e.g., routes and/or locations) of the remaining delivery vehicles, and the number of times the delivery vehicles may have been re-allocated during the time period, the delivery management system may reallocate the delivery vehicle to a second zone. The delivery management system may send a second notification to the client device. This notification may identify the second zone and include instructions to move to the second zone for the remainder of the time block.

Such staged approach results in several technical improvements. One example of technical improvement may relate to balancing the available resources with the delivery demand. In particular, by accounting for how the resources are scheduled and utilized and how the demand changes, an optimal balance for the resource distribution may be stricken. The available resources may be properly utilized, as opposed to being underutilized or over-utilized. The delivery demand may also be efficiently and timely met. Another example of technical improvement may relate to the communication with the client devices. In particular, the optimal amount of communication may be exchanged between the delivery management system and the client devices over a data network, thereby improving usage of network bandwidth and underlying computing resources. The operator's experience may also be improved by providing targeted and relevant information to each operator.

For example, the operator may receive an identification of the zone within which to operate. If no re-allocation occurs, no additional notifications may be transmitted to the operator's device. If a re-allocation should occur, the proper notification may be targeted to the operator's device without having to notify other operators. Accordingly, significant network bandwidth usage, computational resource usage, and improvement to the operator's experience may be achieved.

In the interest of clarity of explanation, the embodiments of the present disclosure are described using examples of managing item deliveries within zones. However, the embodiments are not limited as such. Instead, the embodiments apply to other types of clusters, services, and resources. Specifically, a zone is described as an example of cluster from which a service is available. A delivery service is described as an example of a service facilitated by utilizing a delivery vehicle. A delivery vehicle is described as an example of a resource allocated to a cluster. Other types of clusters, resources and/or services are likewise possible. Generally, a cluster may represent a grouping of service sources for providing a service to end users. The service may originate from any of the service sources. A service may include providing tangible items (e.g., a physical product) and intangible items (e.g., streaming content) from a service source to an end user, a destination location associated with an end user, or a computing device associated with an end user. A resource may represent a means for facilitating the service such that the service may become available from a service source to an end user. For example, a resource may include a space within a facility, a service may include storage of items within the space, and a cluster may include a grouping of spaces or facilities. In another example, a resource may include a virtual machine within a content data network, a service may include streaming content based on a computing service hosted on the virtual machine, and the cluster may include a clusters of virtual machines across different geographical regions.

FIG. 1 illustrates an example environment for managing the distribution of dynamic resources based on a dynamic demand for a service. As illustrated, the service and the resources include a delivery service and delivery vehicles, respectively. In an example, the service may be provided from a service provider while the delivery vehicles may be operated by clients different from the service provider. In this example, item deliveries may be crowd sourced from the service provider to the clients.

The example environment may include client devices 110 communicatively coupled with a server 120 of the service provider over a data network 140. The server 120 may provide information to the client devices 110 about distributions of a fleet 112 of delivery vehicles to a service area 150. For each vehicle, the distribution may include an initial allocation to a zone within the service area 150 and a subsequent re-allocation to another zone. The client devices 110 may interact with the server 120 to receive the information. Clients operating the client devices and/or the delivery vehicles may accordingly deploy the fleet 112 to the service area 150.

The service area 150 may represent a geographic region at one or more resolution levels. The resolution may vary between a full address location, a neighborhood, all the way up to a city or state, and/or even a higher resolution level. Generally, the service area 150 may be divided into a number of zones. A zone 152 may represent a cluster of service sources 154, where the cluster may include a sub-area of the service area and where a delivery service may be facilitated from the service sources 154 grouped in the cluster. A service source may represent a source from which an item may be available, such that a source location or an origin from which a delivery of the item may start. A retail store, a warehouse, an a restaurant may be examples of a service source.

In an example, a client, such as a vehicle operator, may operate a client device, such as any of client devices 110A-110L. The client device may represent an end user device suitable for communication with the server 120 over the data network 140. For example, the client device may be a desktop computer, a laptop, a smartphone, a tablet, or other types of a computing device. The client device may also be associated with a client identifier that may uniquely identify the client. For example, the client identifier may include a username of the client and/or an internet protocol (IP) address or media access control (MAC) address of the client device.

Each of the clients may also be associated with one or more delivery vehicles 112A-112L of the fleet 112. A delivery vehicle may represent a vehicle suitable for moving items between source and destination locations. Examples of the delivery vehicle may include a truck, a passenger car, a bicycle, an airplane, a drone, or other suitable vehicles. Some of the delivery vehicles may be manually operated (e.g., operated by a human person). Other delivery vehicles may be semi-autonomously operated (e.g., remotely operated). Yet other delivery vehicles may be fully autonomous, at least with respect to performing certain delivery-related actions (e.g., the operator may be an automated process). In this case, the autonomous delivery vehicle may integrate a client device.

The fleet 112 may be flexible and dynamic. A client associated with a delivery vehicle may operate a client device to register the delivery vehicle with the server 120. The client may also operate the client device to interact with the server 120 and schedule delivery blocks. A delivery block may represent a work unit that may relate to item deliveries, may be offered to a client, and may have a number of attributes such as date, start time, duration, delivery type, and geographical area of deliveries. At any time, the client may register or withdraw from participating in the delivery service that the server 120 may facilitate.

The server 120 may be a component of a delivery management system and may be configured to manage certain operations of the delivery crowd sourcing. Examples of the managed operations may include scheduling and instructing the client devices about the delivery blocks, dividing the service area 150 into zones, and managing and instructing the client devices 110 about the distribution of the fleet 112 across the zones. The server 120 may represent a back end system suitable to perform such operations and to interact with the client devices 110 over the data network 140. For example, the server 120 may include dedicated computing hardware or a computing service hosted within a data center (e.g., a cloud-based computing service).

The data network 140 may represent a communications network suitable for data exchange. For example, the data network 140 may include a public network (e.g., the Internet) or a private network (e.g., an intranet), may be wired or wireless, and may support different communication protocols.

Interactions between the client device 110A and the server 120 are described herein next. Interactions of remaining client devices 110B-110L may be similar. Such similarities are not repeated herein in the interest of clarity of explanation.

A client may operate the client device 110A to register the delivery vehicle 112A with the server 120. The registration may identify the type and capacity of the delivery vehicle 112A and the service type(s) associated with utilizing the delivery vehicle 112A. A service type may specify the frequency, speed, and/or other delivery-related parameters of moving items. For example, the service type may identify that the delivery vehicle 112A is usable for two-hour deliveries, two-day deliveries, and/or other delivery services. The client may similarly register other delivery vehicles such that the client may be able to operate multiple delivery vehicles. The server 120 may store the registration information in a profile of the client. The client may also operate the client device 110A to identify and transmit availabilities and preferences about utilizing the delivery vehicle 112A to the server 120 over the data network 140.

In turn, the server 120 may schedule delivery blocks for the delivery vehicle 112A and may send information about the schedule to the client device 110A. The information may notify the client about the schedule and identify the service area 150.

Next, the server 120 may distribute the delivery vehicle 112A to one or more zones of the service area. In an example, the distribution may follow a staged approach. In a first stage, the server 120 may initially allocate the delivery vehicle 112A to a first zone 156. The initial allocation 132 may consider a delivery forecast 122, zone properties 154, schedules 126 of the various delivery vehicles 112A-112L, and any current allocations 128 of the remaining delivery vehicles 112B-112L. The server 120 may balance such parameters against a set of objectives and constraints. The server 120 may send a notification about the initial allocation 132 of the delivery vehicle 112A to the zone 156 to the client device 110A over the data network 140. Accordingly, the client may operate the delivery vehicle 112A for deployment to the zone 156.

Once in the zone 156, actual demand for an item available from a service source within the zone 156 may be received. The server 120 may send instructions to the client device 110A for delivering the item from the service source to a destination location. Location data 114 and/or delivery-related data (e.g., a scan of the item) may be tracked to monitor the delivery and the performance of the client.

In a second stage, the server 120 may re-allocate the delivery vehicle 112A to another zone 158. The re-allocation 134 may be performed based on a trigger event. In an example, the trigger event may include a frequency of, or equivalent time intervals for, balancing the distribution of the fleet 112 across the service area 150. For instance, while the delivery vehicle 112A is scheduled for a number of delivery blocks within a period of time (e.g., for three two-hour delivery blocks within an eight hour time period), the re-balancing may be performed every five minutes (or some other time interval). In another example, the trigger event may include a change to the delivery forecast 122 and/or the fleet 112 (e.g., the delivery capacity decreasing or increasing based on addition or withdrawal of delivery vehicles). When larger than a threshold amount, the change may trigger the server 120 to perform the re-balancing.

In the second stage, the re-allocation 134 of the delivery resource 112A to the zone 158 may be performed based on a more refined delivery forecast 122 and the actual location data 114. For example, the server 120 may consider the most up-to-date delivery forecast 122, the location data 114 in addition to the zone properties 154, the schedules 126 of the delivery vehicles 112A-112L, and the current allocations 128 for the remainder of the time period. The server 120 may balance such parameters against the same or a different set of objectives and constraints. A notification about the re-allocation 134 may be sent to the client device 110A over the data network 140. Accordingly, the client may operate the delivery vehicle 112A to move from the initial zone 156 to the new zone 158.

Here also, once in the zone 158, actual demand for an item available from a service source within the zone 158 may be received. The server 120 may send instructions to the client device 110A for delivering the item from the service source to a destination location.

Figure 2:
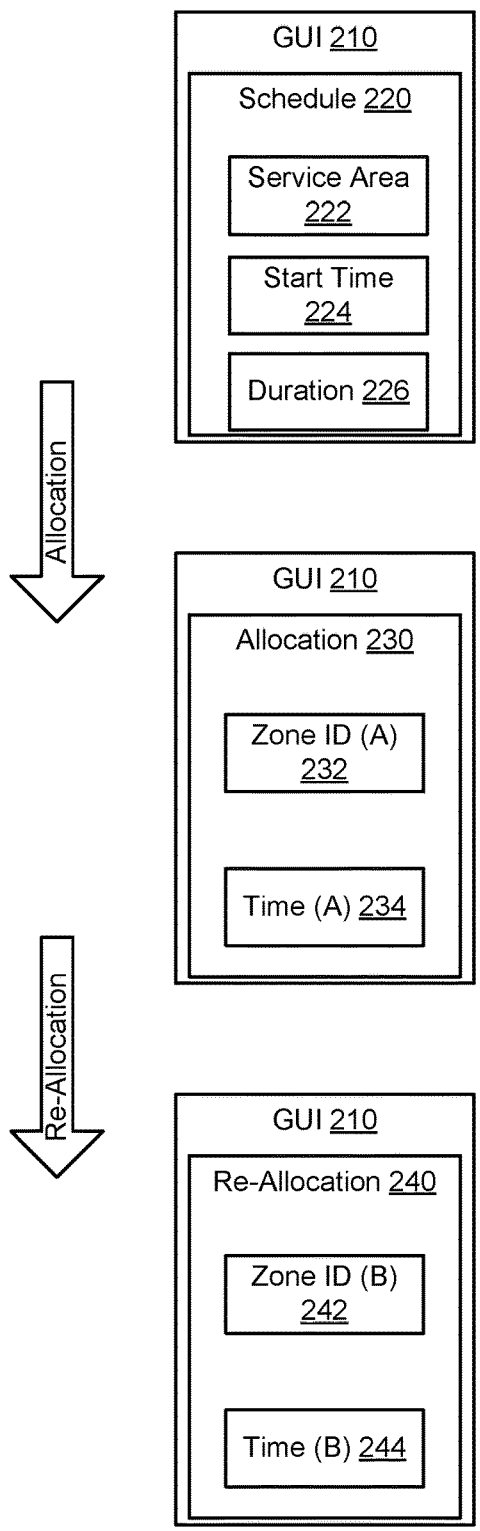
FIG. 2 illustrates an example graphical user interface (GUI) of a client device based on interactions with a server during different stages of managing resource distribution, according to an embodiment of the present disclosure.

FIG. 2 illustrates an example graphical user interface (GUI) 210 of a client device based on interactions with a server during different stages of managing resource distributions, such as the allocation and re-allocation of delivery vehicles in connection with crowd sourcing of item deliveries. The GUI 210 may represent a user interface to an application hosted on the client device. In an example, the application may be an item delivery-related application available from an application store or some other network resource. The item delivery-related application may interact with a server of a delivery management system, such as the server 120 of FIG. 1, over a data network via an interface, such as a web interface or an application program interface (API). In another example, the application may be a web browser in communication with a web site or other web-based resources of the server.

Initially, the GUI 210 may present a schedule 220 to a client. The schedule 220 may represent a set of information about delivery blocks scheduled for a delivery vehicle associated with the client. For example, the schedule 220 may include an identifier of a service area 222 a start time 224 for initiating delivery work in the service area 222, and a duration 226 for the delivery work, along other delivery-related information (e.g., number of delivery blocks, one or more attributes of the delivery blocks, etc.). In an example, the client device may receive the schedule from the server in response to indicating availabilities and preferences for the scheduling and/or in response to selecting delivery blocks available during a window of time (e.g., next week).

Shortly (e.g., an hour or some other time length) before a start of a time period (e.g., a day) during which the delivery vehicle may be scheduled and/or shortly before a start of the first scheduled delivery block, the client device may receive information about an allocation 230 of the delivery vehicle to a zone. The GUI 210 may present this information. For example, the GUI 210 may present an identifier 232 of the zone and a time 234 by which the delivery vehicle should arrive to a location in the zone, along other delivery-related information (e.g., an identifier of the location, a map, etc.).

Throughout the time period (e.g., a day) and before an end of the last scheduled delivery block, the client device may receive information about a re-allocation 240 of the delivery vehicle to a new zone. This information may be received as soon as the server may generate the re-allocation or shortly before a time when the delivery vehicle should move to the new zone (e.g., in sufficient time to accommodate for the travel to a location in the new zone). The GUI 210 may present the information. For example, the GUI 210 may present an identifier 242 of the new zone and a time 244 by which the delivery vehicle should arrive to a location in the new zone, along with other delivery-related information (e.g., an identifier of the location, a route to the location, etc.).

In an example, when determining the initial allocation or a re-allocation, the server may also determine a number of subsequent re-allocations of the delivery vehicle to occur within the time period. Information about the subsequent re-allocations may be provided to the client device for presentation at the GUI 210. In one example, the presentation may occur in conjunction with the re-allocation 240, such that the presented information may identify the different zones for the different time frames of the time period. In another example, the presentation may be limited to the immediately next re-allocation, such that any re-allocations thereafter may be hidden from the client and surfaced only in due time. An advantage of this type of presentation may include allowing changes to the later re-allocations in a transparent manner to the client.

Figure 3:
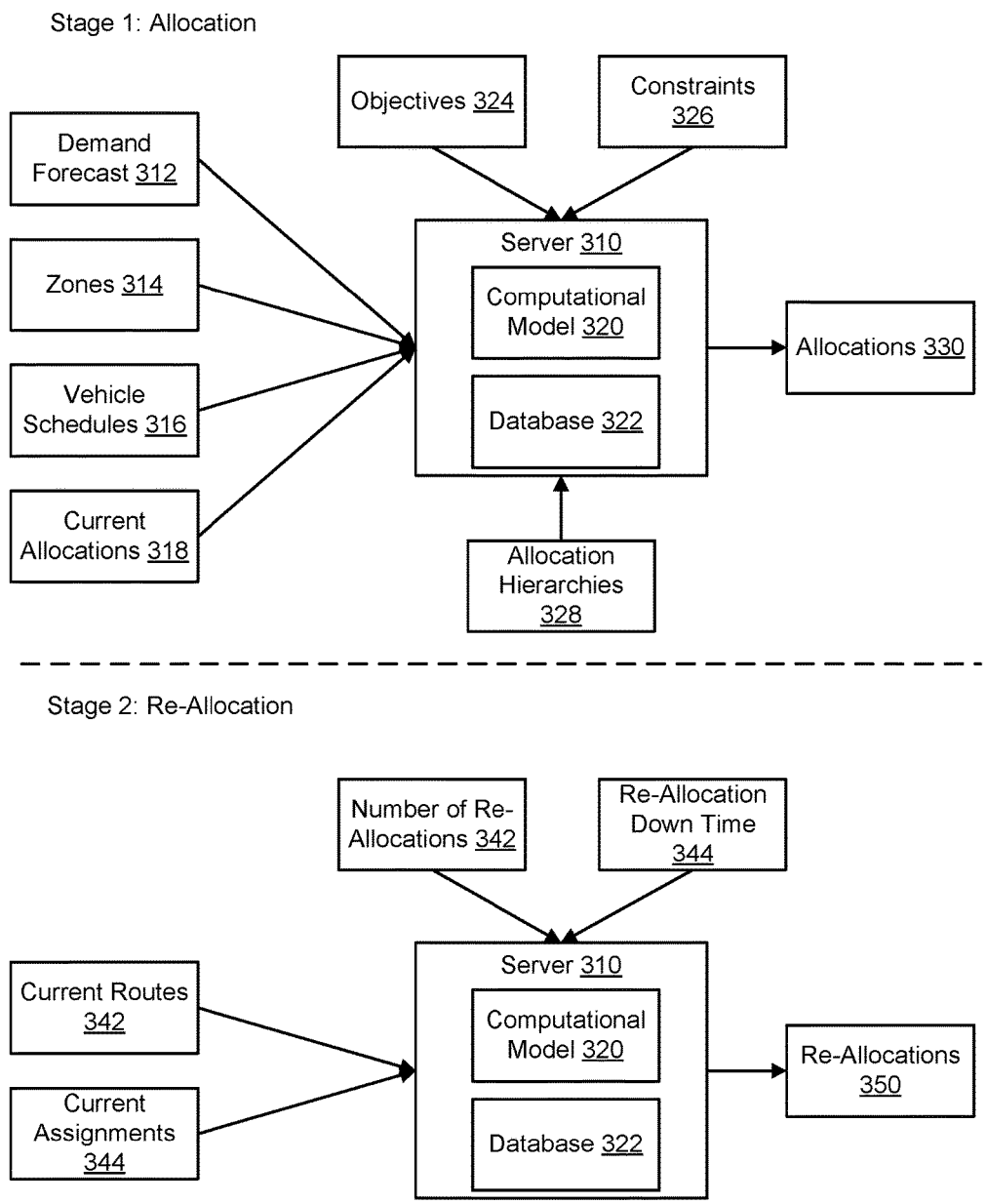
FIG. 3 illustrates an example configuration of a server to support different stages of managing resource distribution, according to an embodiment of the present disclosure.

FIG. 3 illustrates an example configuration of a server 310 to support different stages of managing resource distribution, such as for allocating and re-allocating delivery vehicles to zones to facilitate crowd sourcing of item deliveries. The server 310 may host a computational model 320 and maintain, locally or remotely, a database 322. The computational model 320 may generate and output the distribution based on a set of inputs. The inputs and outputs may change depending on the stage. An example of the computational model 320 is further described in connection with FIGS. 4 and 5. The database 322 may identify how a service area may be divided into zones and may track schedules of delivery vehicles and the distribution thereof across the zones. Tracking such associations in the database 322 may be paramount to efficiently and properly balancing available resources against delivery demand and efficiently and properly communicating with the client devices. Otherwise, managing the crowd sourcing according to a staged approach may necessitate a much higher computational burden to manage the distribution.

In a first stage, the server 310 may output allocations 330 of the delivery vehicles to the zones. The allocations 330 may be initial and may be applicable for a time duration (e.g., a day). The server 310 may generate such allocations 330 at a particular time before the start of the time period. On one hand, the closer to the start of the time period, the more balanced and the better the vehicle utilizations may be. One reason may include the use of the latest and greatest delivery demand forecast. On the other hand, the later the particular time may be, the less time may be available for the proper deployment of the delivery vehicles. Hence, a good balance for the particular time may be to generate and/or provide the allocations 330 to client devices just in time to support the proper deployment.

In this stage, inputs to the computational model 320 may include the delivery demand forecast 312, identifiers of the zones 314, the delivery vehicle schedules 316, and any current allocations 318 of the delivery vehicles to the zones. The delivery demand forecast 312 may represent the delivery demand expected per zone during the time period. In an example, the delivery demand forecast 312 may be generated based on historical delivery demand, the most up-to-date actual delivery demand, and a velocity of the actual demand. For instance, the forecast for delivery demand expected on a particular day of the week may be generated based on the demand received on previous days of the week, the current actual demand received on so far on the particular day, and the velocity of the actual demand (e.g., whether increasing or decreasing and the rate of the change). In addition to considering the delivery demand forecast 312, the actual demand may also be used as an input to the computational model 320. In this way, the actual demand may be used to supplement the delivery demand forecast 312 resulting in more refined allocations.

An identifier of a zone may identify the zone and properties of the zone. These properties may include a size of the zone (e.g., the number of service sources located in the zone, the geographical size of the zone, etc.) and a needed delivery capacity given the size and the respective delivery demand forecast. In an example, the database 322 may track this information.

A delivery vehicle schedule may identify the schedule of a delivery vehicle, such as the number of scheduled delivery time blocks, the time frames of these time blocks, and the associated service area. In an example, the database 322 may also track this information.

A current allocation of a delivery vehicle may identify the zone to which the delivery vehicle may be currently allocated in addition to any location data available about the delivery vehicle relative to the zone. In an example, the database 322 may also track this information.

In an example, the computational model 320 may balance these inputs against the objectives 324 and constraints 326. The objectives 324 may ensure that the forecasted delivery demand may be met in the most efficient manner. For instance, various potential allocations may exist for distributing the delivery vehicles across the zones. Any of such potential allocations may result in a shortage between the delivery capacity provided by the potential allocation and the forecasted delivery demand. The objectives 324 may specify that the potential allocations that result in the smallest shortages should be selected and used.

On the other hand, the constraints 326 may further refine the selection of the allocations 330 from the potential allocations. For instance, various shortages may occur over time given that the delivery demand and the delivery vehicle availabilities may be dynamic. Accordingly, the constraints 326 may favor later shortages over earlier shortages that may occur during the time period. To influence the selection, the constraints 326 may impose relatively higher penalties for the earlier selections. In another illustration, particular types of demand may necessitate specific resource allocations. For instance, delivering a certain type of items from a particular location (e.g., large items from a warehouse) may dictate a minimum amount of work units, such as scheduled blocks of time (e.g., at least four scheduled hours, whereas delivery vehicles may be scheduled at multiple of two hour time blocks). In this illustration, the constraints 326 may further qualify the delivery vehicles, where only delivery vehicles having schedules that meet the minimum amount of work units may be allocated to meet the particular type of demand. In other words, this demand-based type of the constraints 326 may enable the computational model 320 to distinguish between the different demand types and properly allocate delivery vehicles to any demand type that necessitates particular scheduled support.

In an example, the computational model 320 may further consider an allocation hierarchy 328. The allocation hierarchies 328 may specify preferences and hierarchies thereof for allocating particular types of delivery vehicles to particular types of demand. For instance, automobiles may be preferred to deliver one type of items (e.g., grocery), while bicycles may be preferred for another type of items (e.g., magazines). In another illustration, faster delivery vehicles may be favored for demand that has a short turn around. Similarly to the constraints 326, the allocation hierarchies 328 may be used to further qualify the delivery vehicles.

Based on the balance between the inputs and the objectives 324 given the set of constraints 326, and/or any applicable allocation hierarchy 328, the computational model 320 may output the allocations 330. For delivery vehicles not previously allocated to zones, the allocations 330 may identify a zone to which each of the delivery vehicles may be allocated and a time that the delivery vehicle should be deployed to the zone. In an example, the database 322 may track the allocations 330. For instance, each delivery vehicle may be associated with a client identifier. Likewise, each zone may be associated with a zone identifier. Accordingly, the database 322 may correlate the client identifiers and the zone identifiers along with timing information to reflect the allocations 330.

In a second stage, the server 310 may output re-allocations 350 of the delivery vehicles. In this stage, a delivery vehicle already allocated to one zone may be re-allocated to another zone. Conversely, a zone to which particular delivery vehicles are already allocated may be allocated new delivery vehicles and/or de-allocated some of the particular delivery vehicles. However, not all of the allocations need to change in the second stage. In fact, the server 310 may search for the smallest possible change that may nonetheless be optimal given any change to the delivery demand and/or delivery vehicle availabilities.

Accordingly in this second stage, inputs to the computational model 320 may include updates to the inputs used in the first stage. In particular, the server 310 may rely on updates to the delivery demand forecast 312 for the remainder of the time duration, on any changes to the division of the service area into zones or to the properties of each zone (e.g., changes in the needed delivery capacities), and/or on any changes to the schedules of the delivery vehicles or to the available delivery capacity (e.g., the capacity decreasing because of a scheduled delivery vehicle withdrawing from service contrary to the schedule).

The server 310 may also consider additional inputs. These inputs may relate to current utilizations of the delivery vehicles. For example, the additional inputs may include current routes 342 and current assignments 344. A current route of a delivery vehicle may identify a travel path and/or the most up-to-date location of the delivery vehicle. A current assignment of a delivery vehicle may identify a utilization state of the delivery vehicle, such as whether the delivery vehicle may be sitting idle within an allocated zone or on route for a delivery of an item within the zone.

In an example, the computational model 320 may balance the updated and additional inputs against the objectives 324, constraints 326, and/or allocation hierarchy 328. Further, the inputs may be balanced against the number of re-allocations 342 and/or the re-allocation down time 344. These two parameters may be thought of as additional objectives and/or constraints. A number of re-allocations of a delivery vehicle may represent the number of times the delivery vehicle may have been re-allocated during the time period. A re-allocation down time may represent a travel time and/or a travel distance associated with re-allocating a delivery vehicle from one zone to another one. During the re-allocation down time, the delivery vehicle may not be usable to facilitate a delivery and, thus, may represent a utilization inefficiency. Accordingly, the computational model 320 may also attempt to reduce the number of re-allocations 342 and/or the re-allocation down time 344 across the fleet such as any resulting inefficiency is outweighed by the gained utilization and reduced shortage.

Based on the balance, the computational model 320 may output the reallocations 350. For impacted delivery vehicles, the re-allocations 350 may identify the new zones and times to be re-deployed to the new zones. In an example, the database 322 may track the re-allocations 350 by updating, as needed, the correlations between the client identifiers and the zone identifiers, along with the respective re-deployment times.

Figure 4:
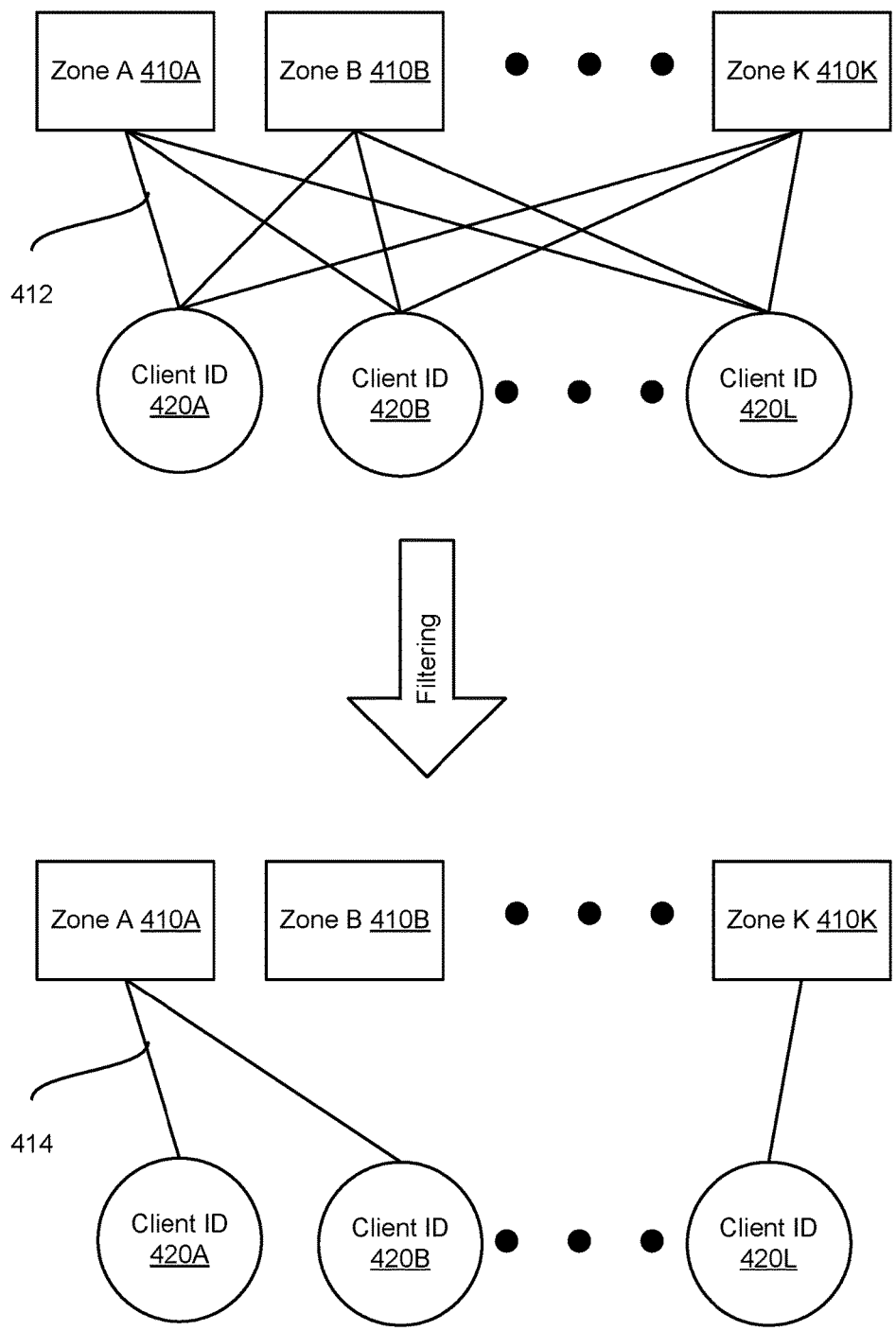
FIG. 4 illustrates an example computational model for generating initial allocations, according to an embodiment of the present disclosure.

FIG. 4 illustrates an example computational model for generating initial allocations. In an example, the computational model may map client identifiers 420A-420L to zones 410A-412K for a time period. Each client identifier may be associated with a client device and a delivery vehicle. The mapping may include all potential allocations 412 of the client identifiers 420A-420L (or, equivalently, delivery vehicles) to the zones 410A-410K. In other words, each client identifier is potentially allocated to each zone for the length of the scheduled delivery blocks of the client during the time period. Hence, the potential allocations 412 may represent all possible and unconstrained allocations. As illustrated, client identifier 420A is potentially allocated to all of the zones 410A-410L. Likewise, client identifier 420B is potentially allocated to all of the zones 410A-410K, and so on and so forth across the different client identifiers.

Next, the computational model may filter the potential allocations 412 to select the initial allocations 414. The filtering may implement a search for an optimal solution from the potential allocations 412 that may meet a set of objectives given a set of constraints. In an example, an objective function, or some other search algorithm, may be used to find the optimal solution. The computational model may set the potential allocations included in the optimal solution as the initial allocations 414. As illustrated, the optimal solution allocates client identifier 420A and client identifier 420B to zones 410A, while client identifier 420L is allocated to zone 420K.

In an example, the computational model may generate the initial allocations 414 as a solution to an optimization problem, where the potential allocations 412 may be represented as options. An objective of the computational model may be to minimize shortages between delivery capacity and delivery demand. The constraints may favor later shortages over earlier ones. Another objective may be to minimize any down time, where the down time may relate to a delivery vehicle moving into a holding location within a zone and moving between the holding location and a source location. For example, the down time may include a travel time to the holding location and a transit time from the holding location to the source location.

This problem-solution approach may be formulated with the following variables:

$X_{ik}$ {1, if delivery vehicle "i" is assigned to a zone "k" at a start of a delivery block;
{0, otherwise.

$W\_U_{kmpt}$ The unsatisfied capacity for zone "k," transportation mode "m" (e.g., delivery vehicle type) at time "t" if shortage falls in percentile "p" (e.g., 5%).

$W\_O_{kmt}$ The excess capacity for zone "k" and transportation mode "m" at time "t."

The following parameters may also be defined:
$b_{ikd}$ {1, if Xik covers demand "d;"
{0, otherwise.

$W\_Num_{km}$ Number of delivery vehicles already staged at zone "k" of transportation mode "m" at the start of time window being solved.

$W\_Demand_{kmt}$ Demand for zone "k" and transportation mode "m" at time "t."

$W\_M_{kmtp}$ Penalty for not meeting the demand at zone "k" and transportation model "m" at time "t" based on percentile "p."

$W\_N_{kmt}$ Penalty for exceeding the demand at zone "k" and transportation mode "m" at time "t."

$C_{ik}$ Penalty for assigning delivery vehicle "i" to zone "k."
$W\_U_d$ Penalty for not meeting the required demand "d."

The problem may be solved by setting an objective to "Minimize:$\Sigma_{\forall i,k} C_{ik}*X_{ik}+\Sigma_{\{k,m,t,p\}} W\_M_{kmtp}*W\_U_{kmtp}+\Sigma_{\forall k,m,t} W\_N_{kmp}*W\_O_{kmp}+\Sigma_{\forall d} W\_U_d*U_d$." A demand constraint and a delivery vehicle allocation constraints may be imposed. These two constraints may be expressed as following.

Demand Constraint:

$\Sigma_i X_{ik}+\Sigma_p W\_U_{kmtp}-W\_O_{kmt}=W\_Demand_{kmt}-W\_Num_{kmt}$ (for each zone "k" and transportation mode "m," where $W\_Demand_{kmt}$ is covered by $X_{ik}$).

Delivery Vehicle Allocation Constraints:

$\Sigma_k X_{ik}=1$ for every delivery vehicle "i."

Minimum Capacity Constraints:

$\Sigma_{i,k} b_{ikd}*X_{ik}+U_d \geq D_d$ for each demand "d"

The solution may be bounded by $0 \leq W\_U_{kmpt\ p} \leq 0.05*W\_Demand$ and $0 \leq W\_O_{kmt} \leq \infty$.

Figure 5:
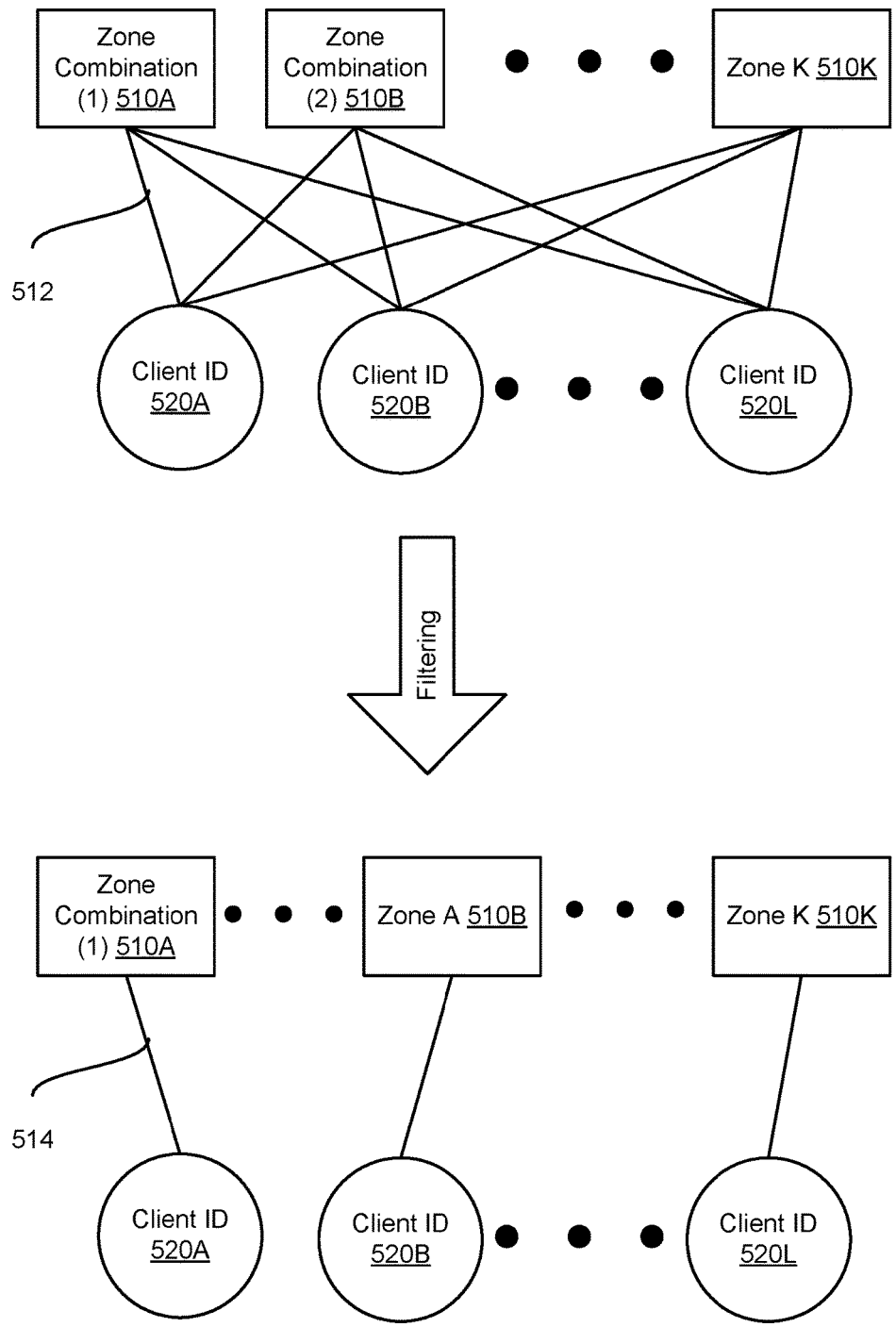
FIG. 5 illustrates an example computational model for generating re-allocations, according to an embodiment of the present disclosure.

FIG. 5 illustrates an example computational model for generating re-allocations. In an example, the computational model may be similar to the above computational model with a number of differences. One difference may relate to the options. Specifically, rather than potentially allocating a delivery vehicle to a single zone for the scheduled delivery blocks of the delivery vehicle, the computational model may allow re-allocations at various times of the scheduled delivery blocks. However, at any point in time, a delivery vehicle may be assigned to only a single zone rather than multiple ones. Relatively to FIG. 4, a larger overall number of options may exist where many of the options include potential re-allocations. Another difference may relate to the constraints. Specifically, the computational model may minimize the number of re-allocations that a delivery vehicle may encounter during the scheduled delivery blocks of the delivery vehicle. For instance, if an option to re-allocate and an option to maintain the current allocation result in a same shortage, the latter option may be favored.

As illustrated, the computational model may map client identifiers 520A-520L to zone combinations 510A-510K. A zone combination may represent a single zone (e.g., no re-allocation) or a plurality of zones (e.g., a re-allocation from one zone to at least one other zone). Mapping may include all potential re-allocations 512 of the client identifiers 520A-520L (or, equivalently, delivery vehicles) to the all potential zone combinations 510A-510K. In other words, each client identifier is potentially maintained in a current allocated zone or potentially re-allocated to any other zone. Hence, the potential re-allocations 512 may include all possible and unconstrained re-allocations.

Next, the computational model may filter the potential allocations 512 to select the re-allocations 514. The filtering may implement a search for an optimal solution from the potential allocations 512 that may meet a set of objectives given a set of constraints. In an example, an objective function, or some other search algorithm, may be used to find the optimal solution. The computational model may set the potential re-allocations included in the optimal solution as the re-allocations 514.

Figure 6:
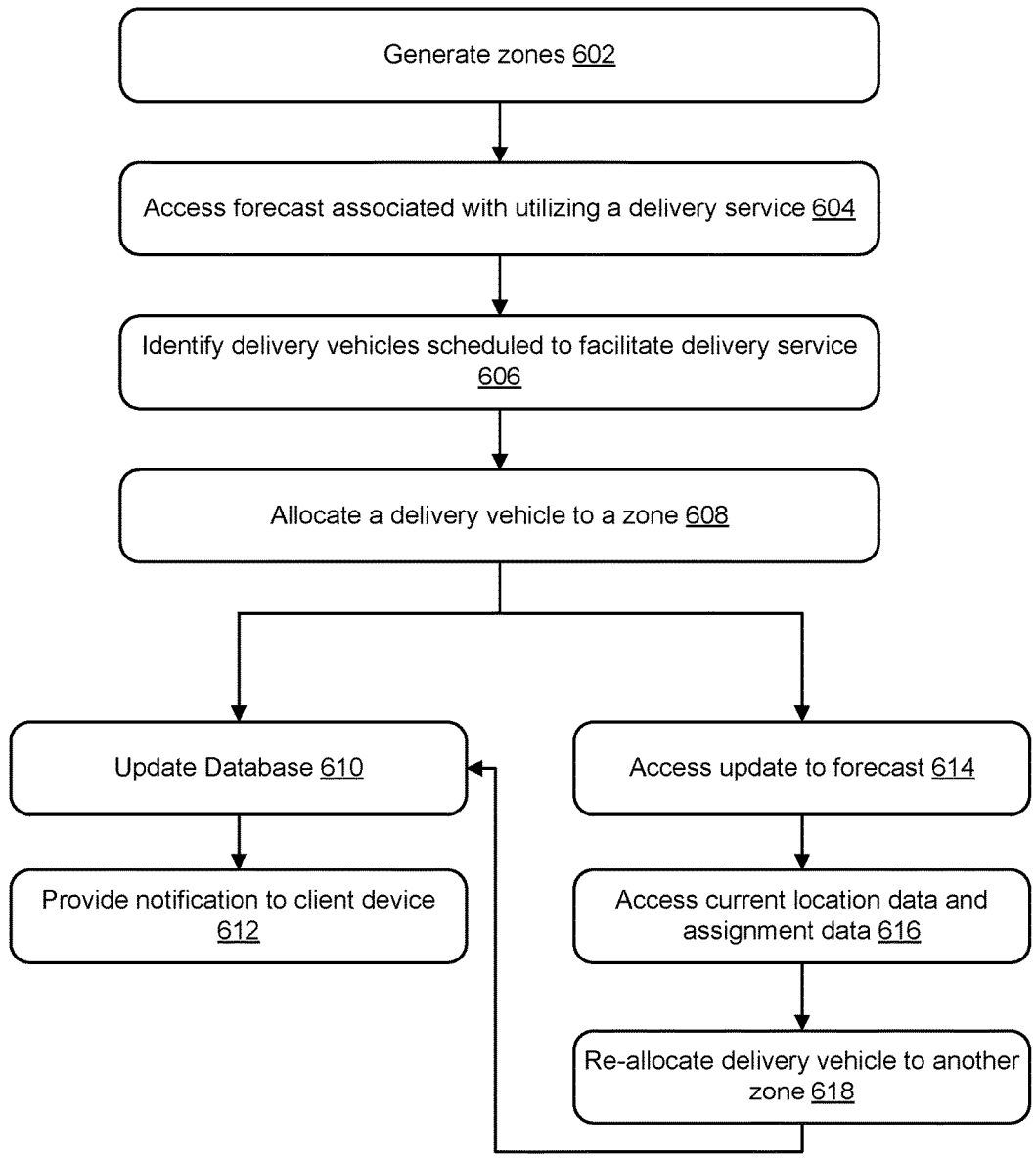
FIG. 6 illustrates an example flow for distributing a resource to clusters based on a staged approach, according to an embodiment of the present disclosure.
Figure 7:
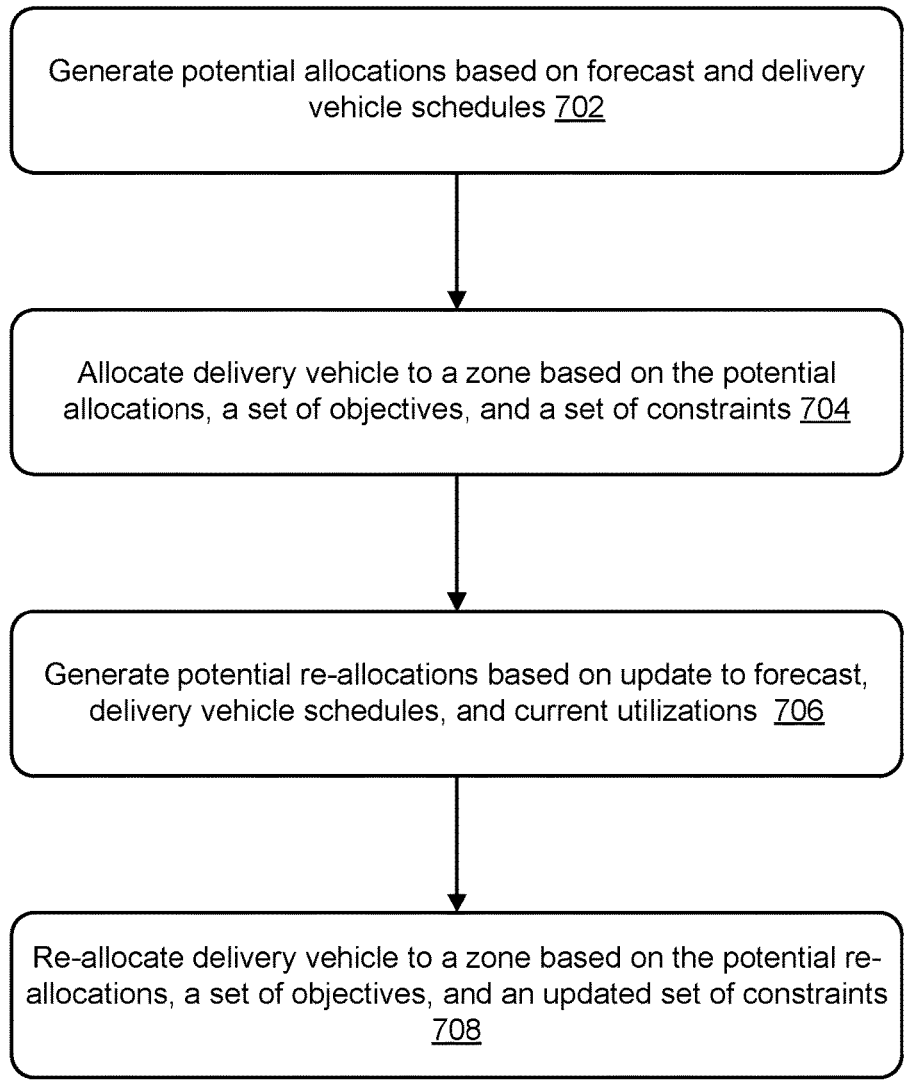
FIG. 7 illustrates an example flow for searching for an optimal distribution of resources to clusters based on a staged approach, according to an embodiment of the present disclosure.

FIGS. 6-7 illustrate example flows for the distribution of resources to clusters, such as delivery vehicles to zones within a service area. In the example flows, some of the operations may be embodied in, and fully or partially automated by, components executed by one or more processors hosted on a server, where the server may be communicatively coupled with client devices over a data network. In the interest of clarity of explanation, a distribution of a single delivery vehicle to a zone may be described in connection with the example flows. However, these flows similarly apply to the distribution of all delivery vehicles within a fleet. While the operations are illustrated in a particular order, it should be understood that no particular order is necessary and that one or more operations may be omitted, skipped, and/or reordered. In addition, some of the operations may be similar across the example flows. Such similarities are not repeated herein.

FIG. 6 illustrates an example flow for distributing a resource to clusters based on a staged approach. In this example, a delivery vehicle and zones of a service area are described. The example flow similarly applies to other resource and cluster types. The stages may include a first stage for an initial allocation of the delivery vehicle to a zone and a second stage for a re-allocation of the delivery vehicle to another zone as needed.

The example flow of FIG. 6 may start at operation 602, where the server may generate the zones. For example, the server may access information about a size of the service area, location of item sources in the service area, and historical delivery demand associated with the item sources. The server may divide the service area into zones based on the information. The frequency at which these divisions may occur may be larger than that for distributing the delivery vehicles (e.g., on a monthly or weekly basis in comparison to a daily distribution). One example of division may balance the delivery demand across the different zones such that the delivery demand may be uniform across these zones. Another example of division may be geographical, where each zone may be sized to cover a particular geographical region. In yet another example of division, the service area may be divided such that each zone may contain a number of item sources falling within a range.

At operation 604, the server may access a forecast associated with utilizing a delivery service. The forecast may indicate the delivery demand expected within each zone over a time period (e.g., a day). The forecast may be generated based on historical delivery demand, actual delivery demand observed early in the time period, and velocity of the actual delivery demand. In an example, the server may access the forecast from a data store or may receive the forecast from a forecast computing service.

At operation 606, the server may identify delivery vehicles scheduled to facilitate the delivery service during the time period. In an example, a database may track the schedules of the delivery vehicles. A schedule may identify delivery blocks assigned to a delivery vehicle during the time period. The server may access the various schedules from the database and identify the delivery vehicles and the expected times during which the delivery vehicles may facilitate deliveries from the item sources. Accordingly, the server may determine a delivery capacity that the scheduled vehicles may provide. When compared to the forecasted delivery demand, shortages, if any, during the time period and across the zones may be identified.

At operation 608, the server may allocate a delivery vehicle to a zone. In an example, the allocation may be based on the scheduled start time of the delivery vehicle, the forecast of the delivery demand, the zones, and/or the allocations of the remaining delivery vehicles to the zones. The server may input the schedules, forecast, identifiers of the zones, and any current allocations to a computational model. The computational model may search for an optimal allocation of the delivery vehicle by balancing the inputs against a set of objectives and constraints. The optimal allocation may be outputted as the allocation of the delivery vehicle. At this operation, the objectives may minimize the shortages and allocation down time. The constraints may favor later shortages over earlier ones.

At operation 610, the server may update the database to indicate that a delivery vehicle is allocated to the zone. For example, the update may correlate an identifier of the zone with a client identifier associated with the delivery vehicle.

At operation 612, the server may provide a notification to a client device. For example, the client device may be associated with the client identifier. The server may send the notification to the client device over a data network for presentation at a user interface of the client device. The notification may identify the zone and may instruct an operator of the delivery vehicle to move into the zone (e.g., to a certain holding location) within a particular time frame (e.g., to arrive to the holding location prior to the start of the first scheduled delivery block).

Operations 604-612 may correspond to a first stage of the distribution. Based on a trigger event (e.g., a frequency of balancing the distribution, a change to the forecast and/or delivery capacity), the server may re-balance the distribution by determining whether the delivery vehicle should be re-allocated to a new zone or should stay within the current zone, and/or whether other delivery vehicles should be re-allocated into or out from the current zone. This re-balancing corresponds to the second stage of the distribution and can be repeated throughout the time period until the last scheduled delivery block. Operations 614-618 illustrate one iteration of the re-balancing and can be iteratively repeated throughout the time period.

At operation 614, the server may access an update to the forecast. The update may represent the forecast for the remainder of the time period and may be available from the data store. In an example, the update may be generated by refining the original forecast given the actual demand and its velocity observed so far during the time period. The server may access the update from the data store or may receive the update from the forecast computing service.

At operation 616, the server may access current location data and assignment data of the delivery vehicles. In an example, the location data may be received from the client devices associated with the delivery vehicles and may identify the locations and/or routes of the delivery vehicles. The assignment data may be accessed from the database. For example, the database may track whether a delivery vehicle is sitting idle in a holding location or is on a delivery mission. This tracking may be based on the location data, received orders for items from end user devices, and scans of the items from the client devices and/or devices at the item sources. In addition, the database may track whether a delivery vehicle is not on schedule or did not join the fleet during its scheduled delivery blocks. Such data may indicate an update to the expected delivery capacity. The location data, the assignment data, and/or any deviation from scheduled delivery blocks may represent current utilizations of the delivery vehicles.

At operation 618, the server may re-allocate a delivery vehicle from a current zone to another zone (or, similarly, re-allocate another delivery vehicle from the other zone to the current zone). In an example, the re-allocation may be based on the current utilization of the delivery vehicle (e.g., its location data and assignment within the current zone), the update to the forecast, and the allocations (and, similarly, re-allocations) of the remaining delivery vehicles to the zones. The server may provide these inputs to the computational model. In turn, the computational model may search for an optimal reallocation by balancing the inputs against a set of objectives and constraints. The optimal allocation may be outputted as the re-allocation of the delivery vehicle. At this operation, the set of constraints may favor solutions that minimize the number of re-allocations of the delivery vehicles and the re-allocation down times.

If the delivery vehicle is re-allocated, operations 610 and 612 may be followed to update the database and send a notification about the re-allocation. Otherwise, the operator of the delivery vehicle need not be notified and no updates to the database may be needed.

FIG. 7 illustrates an example flow for searching for an optimal distribution of resources to clusters based on a staged approach. The server may implement the operations of this example flown in conjunction with operation 608 and 618 of FIG. 6.

The example flow may start at operation 702, where the server may generate potential allocations of the delivery vehicles to the zones based on the forecast for the delivery demand expected during the time period. In an example, for each un-allocated delivery vehicle, the server may map the delivery vehicle (or, equivalently, the client identifier associated with the delivery vehicle) to all of the zones for the remainder of the time period. Accordingly, an un-allocated delivery vehicle may potentially be allocated to all of the zones.

At operation 704, the server may allocate a delivery vehicle (an un-allocated one) to a zone based on the potential allocations, a set of objectives, and a set of constraints. For example, the server may select the allocation from the potential allocations by balancing the potential allocations against the objectives and constraints. In an example, this balancing may be performed by implementing an objective function. The objective function may use different inputs (e.g., the forecast, the schedules, the zones, any current allocations) to search the optimal allocation form the potential allocations given the objectives and constraints.

At operation 706, the server may generate potential re-allocations based on an update to the forecast for the remainder of the time period, delivery vehicle schedules for the remainder of the time period and current utilizations of the delivery vehicles. Here and unlike operation 702, each delivery vehicle may be potentially re-allocated to one or more other zones from a current zone during the remainder of the time period. Thus, the server may relax any limits for generating various re-allocation options. Instead, the server may consider many different re-allocation options. In an example, for each allocated delivery vehicle, the server may generate an option to maintain the current allocation and various options to move the delivery vehicles to other zones given the current utilization (e.g., one option per other zone, and/or one option per combination of a number (two or more) of other zones, where each of these options may meet a down time constraint such that the potential re-allocation may not cause the delivery vehicle to travel or be unusable for a longer time than the down time).

At operation 708, the server may re-allocate a delivery vehicle (an allocated one) to a new zone based on the potential re-allocations, a set of objectives, and a set of constraints. Here, the objectives and constraints may include the ones used at operation 704 and may include additional ones. For instance, the constraints may favor a lower number of re-allocations and/or a shorter down time. In an example, the server may select the re-allocation of the delivery vehicle from the potential re-allocations by balancing the potential re-allocations against the objectives and constraints. In an example, this balancing may be performed by implementing an objective function. The objective function may use different inputs (e.g., the update to forecast, the remaining schedules, the zones, any current allocations, current utilizations) to search the optimal re-allocation form the potential re-allocations given the objectives and constraints.

Figure 8:
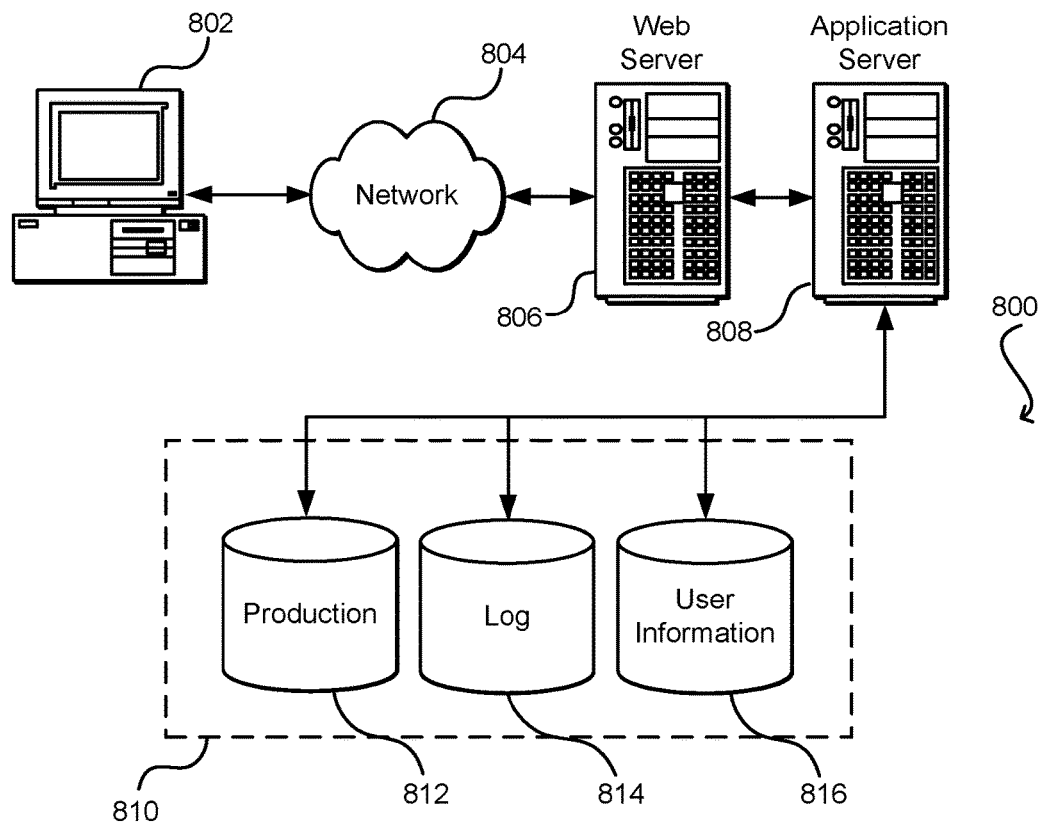
FIG. 8 illustrates aspects of an example environment for implementing aspects of a delivery system, according to an embodiment of the present disclosure.

FIG. 8 illustrates aspects of an example environment 800 for implementing aspects of a management system, such as a delivery management system. The example environment 800 may include components (e.g., computer systems available to host modules and store data) that may be implemented within the management system. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases, or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as page image information to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
one or more processors;
one or more computer-readable storage media comprising instructions that, upon execution by the one or more processors, configure the system to at least:
access a forecast for demand associated with utilizing a service during a time period, the service available from service sources grouped in clusters;
identify, from a database, resources scheduled to facilitate the service across the clusters during the time period, the resources associated with client devices that are communicatively coupled with the system over a data network;
allocate, at a first time, a resource from the resources to a first cluster from the clusters based at least in part on a scheduled start time for utilizing the resource during the time period, on the forecast for the demand, and on an allocation of remaining resources to the clusters, the resource associated with a client device and a client identifier;
update the database with an indication that the client identifier is allocated to the first cluster, the database associating the allocation and client identifiers;
provide, over the data network and prior to the start time for utilizing the resource, a first notification to the client device that the client identifier is allocated to the first cluster based at least in part on the database, the first notification causing a deployment of the resource to the first cluster;
re-allocate, at a subsequent time during the time period, the resource from the first cluster to a second cluster based at least in part on a current utilization of the resource in the first cluster, on an update to the forecast for the demand expected during a remainder of the time period, on the allocation of the remaining resources to the clusters, and on down time associating with re-allocating the resource;
update the database to indicate that the client identifier is re-allocated to the second cluster; and
provide, over the data network, a second notification to the client device that the client identifier is re-allocated to the second cluster based at least in part on the database, the second notification causing a re-deployment of the resource to the second cluster.

2. The system of claim 1, wherein the service sources are grouped in the clusters based at least in part on historical demand for the service over a plurality of time periods, and wherein the forecast for the demand comprises a first forecast that is based at least in part on the historical demand and a second forecast that is based at least in part on actual demand for the service during the time period and on a velocity of the actual demand.

3. The system of claim 1, wherein the time period comprises a plurality of time blocks, wherein the resource is allocated, at the first time, to the first cluster for a first time block of the time period and to a third cluster for a subsequent time block of the time period, wherein the resource is re-allocated to the second cluster for the subsequent time block, and wherein the first notification identifies the first cluster and omits an identification of the third cluster.

4. The system of claim 1, wherein the system is operated by a service provider, wherein the service comprises item deliveries, wherein the service sources comprise item sources operated by operators, wherein the resources comprise delivery vehicles operated by users, wherein the database of the system of the service provider associates the users with the operators.

5. A computer-implemented method, comprising:
accessing, by a computer system, a forecast for demand associated with utilizing a service during a time period, the service available from service sources grouped in clusters;
identifying, by the computer system from a database, resources scheduled to facilitate the service across the clusters during the time period, the resources associated with client devices;
allocating, by the computer system and at a first time, a resource from the resources to a first cluster from the clusters based at least in part on a scheduled start time for utilizing the resource during the time period, on the forecast for the demand, and on an allocation of remaining resources to the clusters, the resource associated with a client device and a client identifier;
updating, by the computer system, the database with an indication that the client identifier is allocated to the first cluster;
providing, by the computer system and prior to the start time for utilizing the resource, a first notification to the client device about the allocating to the first cluster based at least in part on the database, the first notification causing a deployment of the resource to the first cluster;
re-allocating, by the computer system and at a subsequent time during the time period, the resource from the first cluster to a second cluster based at least in part on a current utilization of the resource, on an update to the forecast for the demand expected during a remainder of the time period, and on the allocation of the remaining resources to the clusters;
updating, by the computer system, the database to indicate that the client identifier is re-allocated to the second cluster; and
providing, by the computer system, a second notification to the client device about the re-allocating to the second cluster based at least in part on the database, the second notification causing a re-deployment of the resource to the second cluster.

6. The computer-implemented method of claim 5, wherein the client device is communicatively coupled with the computer system over a data network, wherein the first notification is provided over the data network, and wherein the second notification is provided over the data network.

7. The computer-implemented method of claim 5, wherein the allocating is outputted from a computational model hosted on the computer system, wherein the computational model is configured to generate potential allocations of the resources to the clusters based at least in part on the forecast for the demand, scheduling of the resources during the time period, the clusters, and existing allocations of the resources to the clusters, wherein each potential allocation corresponding to the resource comprises an allocation of the resource to one cluster during the time period, and wherein the computational model is further configured to output the allocating based at least in part on a selection from the potential allocations.

8. The computer-implemented method of claim 7, wherein the selection is based at least in part on a set of objectives, constraints, and allocation hierarchies, wherein the objectives reduce a shortage between resources allocated to the first cluster and demand expected in the first cluster, wherein the constraints favor later shortage in the time period, favor distributed shortage across the clusters, and qualify the resource for the allocating based at least in part on a type of the demand and a schedule of the resource during the time period, and wherein the allocation hierarchies qualify the resource for the allocating based at least in part on the type of the demand and a type of the resource.

9. The computer-implemented method of claim 5, wherein the re-allocating is outputted from a computational model hosted on the computer system, wherein the computational model is configured to generate potential re-allocations of the resources to the clusters based at least in part on the update to the forecast for the demand, scheduling of the resources during the remainder of the time period, the clusters, existing allocations of the resources to the clusters, and a current assignment of the resource within the first cluster, wherein at least one potential re-allocation of the resource comprises an allocation of the resource to a plurality of clusters during the remainder of the time period, and wherein the computational model is further configured to output the re-allocating based at least in part on a selection from the potential re-allocations.

10. The computer-implemented method of claim 9, wherein the selection is based at least in part on a set of objectives and a set of constraints, wherein the set of objectives reduces a shortage between resources re-allocated to the first cluster and demand expected in the first cluster, and wherein the set of constraints reduces a total number of re-allocations of the resource to different clusters during the time period.

11. The computer-implemented method of claim 9, wherein the resource is scheduled for a plurality of time blocks during the time period, and wherein computational model is run at time intervals shorter than the time blocks.

12. The computer-implemented method of claim 11, wherein the re-allocating comprises maintaining an allocation of a second resource to the second cluster.

13. The computer-implemented method of claim 5, wherein the re-allocating further comprises re-allocating a second resource to the second cluster.

14. A computer-readable storage medium comprising instructions that, upon execution by a processor, cause a computer system to perform operations comprising:
   accessing a forecast for demand associated with utilizing a service during a time period, the service available from service sources grouped in clusters;
   identifying, from a database, resources scheduled to facilitate the service across the clusters during the time period, the resources associated with client devices;
   allocating, at a first time, a first resource from the resources to a cluster from the clusters based at least in part on a scheduled start time for utilizing the first resource during the time period, on the forecast for the demand, and on an allocation of remaining resources to the clusters, the first resource associated with a first client device and a first client identifier;
   updating the database with an indication that the first client identifier is allocated to the cluster;
   providing, prior to the start time for utilizing the resource, a first notification to the first client device that the first resource is allocated to the cluster based at least in part on the database, the first notification causing a deployment of the first resource to the cluster;
   re-allocating, at subsequent time during the time period, a second resource from the resources to the cluster based at least in part on a current utilization of the second resource in a second cluster, on an update to the forecast for the demand expected during a remainder of the time period, and on the allocation of the remaining resources to the clusters, the second resource associated with a second client device and a second client identifier;
   updating the database with an indication that the second client identifier is re-allocated to the cluster; and
   providing a second notification to the second client device that the second resource is re-allocated to the cluster based at least in part on the database, the second notification causing a re-deployment of the second resource to the cluster.

15. The computer-readable storage medium of claim 14, wherein the re-allocating comprises maintain the allocating of the first resource to the cluster, and wherein the operations further comprise re-allocating, at a second subsequent time during the time period, the first resource to a second cluster.

16. The computer-readable storage medium of claim 14, wherein allocating the resource to the first cluster comprises:
   generating all potential allocations of the resources to the clusters, each of the potential allocations corresponding to a particular resource and allocating the resource to a particular cluster during the time period; and
   selecting a particular allocation of the resource to the first cluster from the potential allocations.

17. The computer-readable storage medium of claim 16, wherein re-allocating the resource to the second cluster comprises:
   generating all potential re-allocations of the resources to the clusters, each of the potential re-allocations corresponding to a particular resource and at least one of the potential re-allocations corresponding to the particular resource re-allocates the particular resource to a plurality of the clusters during the remainder of the time period; and
   selecting a particular re-allocation of the resource to the second cluster from the potential re-allocations.

18. The computer-readable storage medium of claim 17, wherein the selecting the particular allocation is subject to an objective and a first constraint, and wherein selecting the particular re-allocation is subject to the objective and a second constraint different from the first constraint.

19. The computer-readable storage medium of claim 14, wherein the operations further comprise:
   prior to the first time, provide a notification to the first client device about the resource being scheduled for deployment in a group of the clusters.

20. The computer-readable storage medium of claim 14, wherein the operations further comprise:
   tracking a deployment of the first resource to the cluster based at least in part on the allocating; and
   updating a client profile associated with the first client device based at least in part on the tracking.

* * * * *